United States Patent
Hayami et al.

(10) Patent No.: US 7,287,315 B2
(45) Date of Patent: Oct. 30, 2007

(54) APPARATUS FOR MEASURING SLIDER MOUNTING POSITION IN MAGNETIC HEAD, AND MAGNETIC HEAD MANUFACTURING SYSTEM USING THE MEASUREMENT APPARATUS

(75) Inventors: Kenichi Hayami, Tokyo (JP); Masaaki Kaneko, Tokyo (JP)

(73) Assignee: TDK Corporation, Tokyo (JP)

( * ) Notice: Subject to any disclaimer, the term of this patent is extended or adjusted under 35 U.S.C. 154(b) by 418 days.

(21) Appl. No.: 10/971,072

(22) Filed: Oct. 25, 2004

(65) Prior Publication Data

US 2005/0091834 A1 May 5, 2005

(30) Foreign Application Priority Data

Oct. 29, 2003 (JP) ............................. 2003-368462

(51) Int. Cl.
*B23P 19/00* (2006.01)
*H05K 13/04* (2006.01)

(52) U.S. Cl. ......................... 29/729; 29/737; 29/742; 29/833; 156/64; 156/275.3; 156/275.7; 156/290; 156/378; 360/78.06; 360/78.08; 360/264.2; 360/266.3; 360/244.1

(58) Field of Classification Search ............. 29/603.03, 29/729, 737, 742, 833; 156/64, 275.3, 275.7, 156/290, 378; 360/66, 75, 78.06, 78.08, 360/264.2, 266.3
See application file for complete search history.

(56) References Cited

U.S. PATENT DOCUMENTS 6,284,073 B1 * 9/2001 Nemoto et al. ............... 156/64

6,781,783 B2 * 8/2004 Amano et al. ................ 360/75

FOREIGN PATENT DOCUMENTS

JP 6-215511 8/1994

OTHER PUBLICATIONS

Patent Abstracts of Japan, JP 11-185416, Jul. 9, 1999.

* cited by examiner

*Primary Examiner*—Paul D. Kim
(74) *Attorney, Agent, or Firm*—Oblon, Spivak, McClelland, Maier & Neustadt, P.C.

(57) ABSTRACT

The present invention provides a measurement apparatus for obtaining a suitable position on a suspension where a more miniature magnetic head slider is to be mounted to the suspension, the apparatus including a front camera having a photographing optical axis within a plane parallel to a plane of extension of a suspension and directed to the suspension, and a side camera having a photographing optical axis within the parallel plane and which is different from that of the front camera. Coordinates of a top portion of a convex surface of a dimple formed in the suspension are obtained with these cameras. The resultant coordinates and coordinates of the deepest portion of a recess surface of the dimple are correlated with each other, whereby in actual mounting of the magnetic head slider, the deepest portion of the recess surface of the dimple which is readily recognized is measured.

2 Claims, 8 Drawing Sheets

PRIOR ART

FIG. 10B

PRIOR ART

US 7,287,315 B2

APPARATUS FOR MEASURING SLIDER MOUNTING POSITION IN MAGNETIC HEAD, AND MAGNETIC HEAD MANUFACTURING SYSTEM USING THE MEASUREMENT APPARATUS

BACKGROUND OF THE INVENTION

1. Field of the Invention

The present invention relates in general to a method and an apparatus for measuring a mounting position of a magnetic head slider used in a magnetic recording apparatus such as a hard disk device (hereinafter referred to as "an HDD" for short) when the magnetic head slider is mounted to a so-called suspension for supporting the magnetic head slider. The present invention also relates to a magnetic head manufacturing system for, after verifying a mounting position of a magnetic head slider using the measurement apparatus, fixing the magnetic head slider to a suspension to evaluate a state of fixing of the magnetic head slider to the suspension.

2. Related Background Art

Figure 10A:
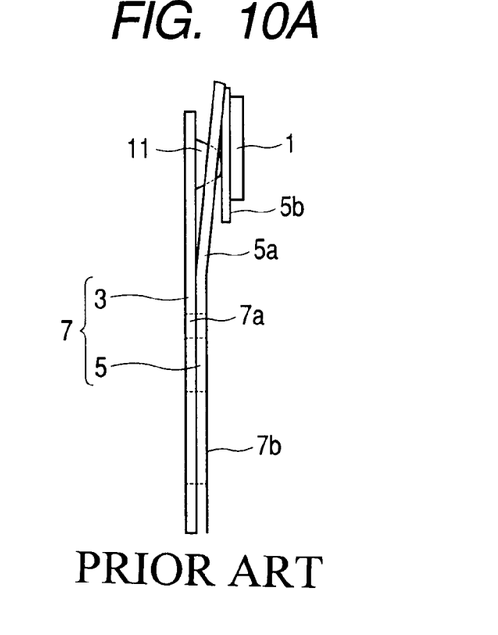
FIG. 10A is a schematic side elevational view of a main portion in a state of mounting of a magnetic head slider to a suspension according to a related art.
Figure 10B:
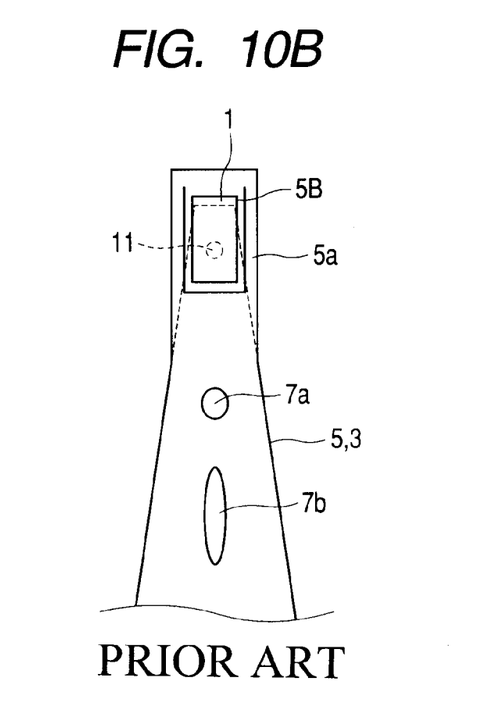
FIG. 10B is a schematic plan view of the main portion in the state of mounting of the magnetic head slider to the suspension according to the related art.

FIG. 10A is a side elevational view showing a schematic construction of a head portion of a magnetic head, and FIG. 10B is a top plan view showing a schematic construction of the head portion of the magnetic head. The magnetic head includes a load beam 3 constituted by a plate spring made of metal, a flexure 5 stuck to the load beam 3 except its head portion to be supported thereby, and a magnetic head slider 1 stuck to the flexure 5 to be supported thereby. The flexure 5 is stuck to the load beam 3, and hence the flexure 5 and the load beam 3 become nearly an integral one body, and act as a suspension 7 in the magnetic head. The flexure 5 includes a main body portion 5a, and a rectangular tongue 5b. Only a side of the head portion of the rectangular tongue 5b is connected to the flexure main body 5a, and other sides thereof are cut.

A dimple 11 projecting toward the flexure 5 side is formed at the head portion of the load beam 3. The dimple 11 applies an urging force to the tongue 5b so that the tongue 5b becomes nearly parallel to the load beam 3 independently of the flexure main body 5a. The magnetic head slider 1 is urged by the dimple 11 through the tongue 5b having the magnetic head slider 1 fixed thereto, and hence can hold an optimal posture in an actual recording/reproducing operation (refer to JP H11-185416 A and JP H06-215511 A).

Heretofore, in an operation for mounting the magnetic head slider 1 to the load beam 3, a position of the suspension 7 itself or positions of a view hole 7a and a touring hole 7b formed in the suspension 7 are measured, and a fixing position of the magnetic head slider 1 is determined based on the measurement results. In addition, a center line of the magnetic head slider 1 is obtained, and the center line is also used as a parameter for the measurement.

As the recording density of the HDD is becoming higher, a track width of the hard disk is becoming narrower, and the magnetic head corresponding to the decreasing track width is also becoming miniaturized and lightweight. In this case, it is demanded that higher accuracy is simultaneously realized when the magnetic head slider is installed and mounted to the miniaturized magnetic head. It is also demanded to enhance the stability of the posture of the magnetic head core in the actual recording/reproducing operation. Essentially, when the magnetic head core is fixed to the suspension, if the stability of the posture of the magnetic head core in the fixing operation is taken into consideration, then the mounting position of the magnetic head core must be determined with the formation position of the dimple as a reference.

However, as apparent from FIGS. 10A and 10B to which reference has been made formerly, since the tongue projects so as to overlie the upper surface of the dimple, the direct measurement of the formation position of the dimple is regarded as impossible until now. In addition, along with miniaturization of the magnetic head core and the dimple, with the conventional method of measuring the mounting position of the magnetic head slider using the core center line, the view hole, and the touring hole, it is becoming difficult to recognize a suitable fixing position.

SUMMARY OF THE INVENTION

The present invention has been made in the light of the above-mentioned circumstances, and it is therefore an object of the present invention to provide a method and an apparatus for measuring a position of mounting of a magnetic head slider to a suspension, each of which is capable of precisely recognizing a dimple position in the suspension and of precisely recognizing a mounting position of the magnetic head slider. It is another object of the present invention to provide a magnetic head manufacturing system for, after verifying a mounting position of a magnetic head slider using the measurement apparatus, fixing the magnetic head slider to a suspension.

In order to solve the above-mentioned problem, according to one aspect of the invention, there is provided a method of measuring a predetermined position on a suspension where a magnetic head slider is to be mounted for use in a magnetic head in which the magnetic head slider is to be mounted in the predetermined position on the suspension having a reference portion so as to be directed in a redetermined direction, the method including:

obtaining first X-Y coordinates of a central portion of the reference portion in an X-Y plane of extension of the suspension;

applying light to a recess surface formed in a back face of a convex surface of a dimple from a direction substantially perpendicular to the X-Y plane, the dimple being formed on the suspension so as to have the convex surface on a side of the suspension to which the magnetic head slider is to be mounted, to photograph the dimple to obtain an image of the dimple, thereby obtaining first X-Y coordinates of a central portion of the dimple in a plane parallel to the X-Y plane based on the image;

photographing the central portion of the reference portion and the central portion of the dimple to obtain respective images to obtain second X-Y coordinates of the central portion of the reference portion and second X-Y coordinates of the central portion of the dimple based on the resultant images and at least one of the first X-Y coordinates of the central portion of the reference portion and the first X-Y coordinates of the central portion of the dimple, thereby obtaining the predetermined direction using the resultant second X-Y coordinates of the central portion of the reference portion and the resultant second X-Y coordinates of the central portion of the dimple;

obtaining X-Y coordinates of a center line and X-Y coordinates of a central point of the magnetic head slider in a direction of extension of the suspension on the X-Y plane; and obtaining a position of the suspension where the magnetic head slider is to be mounted to the suspension by making the center line of the magnetic head slider to agree with the predetermined direction, and making the X-Y coordinates of the central point of the magnetic head slider to agree with the second X-Y coordinates of the central portion of the dimple.

In further aspect of the method, it is preferable that the obtaining of the first X-Y coordinates of the central portion of the dimple includes photographing the convex surface of the dimple from different directions in a plane parallel to the X-Y plane to obtain respective images, thereby obtaining the first X-Y coordinates of a top portion of the convex surface in the plane based on the resultant respective images, and the second X-Y coordinates of the central portion of the dimple are determined by adding thereto an amount of position shift between the first X-Y coordinates of the top portion of the convex surface and the first X-Y coordinates of the central portion of the dimple which are obtained based on the images.

Further, in order to solve the above-mentioned problem, according to another aspect of the invention, there is provided a method of measuring a predetermined position on a suspension where a magnetic head slider is to be mounted for use in a magnetic head in which the magnetic head slider is to be mounted in the predetermined position on the suspension having an index and a reference portion so as to be directed in a predetermined direction, the method including:

obtaining first X-Y coordinates of a central portion of the index and first X-Y coordinates of a central portion of the reference portion in an X-Y plane of extension of the suspension;

photographing a recess surface of a dimple from different directions in a plane parallel to the X-Y plane, the dimple being formed in the suspension so as to have the convex surface on a side of the suspension to which the magnetic head slider is to be mounted, to obtain respective images, thereby obtaining first X-Y coordinates of a top portion of the convex surface in the plane from the resultant respective images;

photographing a central portion of the index or the reference portion to obtain respective images to obtain second X-Y coordinates of the top portion of the convex surface of the dimple based on second X-Y coordinates of the central portion of the index and second X-Y coordinates of the central portion of the reference portion obtained from at least ones of the resultant images and the X-Y coordinates of the central portion of the index and the X-Y coordinates of the central portion of the reference portion, thereby obtaining the predetermined direction using the second X-Y coordinates of the central portion of the index and the reference portion and the second X-Y coordinates of he top portion of the convex surface of the dimple;

obtaining X-Y coordinates of a center line and X-Y coordinates of a central point of the magnetic head slider in a direction of extension of the suspension on the plane; and obtaining a position of the suspension where the magnetic head slider is to be mounted to the suspension by making the center line of the magnetic head slider to agree with the predetermined direction, and making the X-Y coordinates of the central point of the magnetic head slider to agree with the second X-Y coordinates of the top portion of the convex surface of the dimple.

Further, in order to solve the above-mentioned problem, according to another aspect of the invention, there is provided a magnetic head slider mounting position measuring apparatus for measuring a predetermined position on a suspension where a magnetic head slider is to be mounted for use in a magnetic head in which the magnetic head slider is to be mounted in the predetermined position on the suspension having an index and a reference portion so as to be directed in a predetermined direction, the including:

an upper camera and a lower camera having opposite photographing optical axes, respectively, which are perpendicular to a flat surface of extension of the suspension;

a front camera having a photographing optical axis which lies on a flat surface parallel to the flat surface of extension of the suspension and which is directed to the suspension;

a side camera having a photographing optical axis which lies on a flat surface parallel to the flat surface of extension of the suspension and which is directed from a direction different from the photographing optical axis of the front camera to the suspension; and control means for obtaining a positional relationship between a top portion of a convex surface formed on a side of the suspension to which the magnetic head slider is to be mounted, and a reference portion formed in the suspension based on images of the suspension captured with the upper camera, the lower camera, the front camera, and the side camera.

Further, in order to solve the above-mentioned problem, according to another aspect of the invention, there is provided magnetic head manufacturing system for mounting a magnetic head slider in a predetermined direction in a predetermined position on a suspension having a convex surface and a reference portion formed on a side to which the magnetic head slider is to be mounted, the magnetic head manufacturing system including:

a magnetic head slider mounting position measuring apparatus for measuring the predetermined position on the suspension on which the magnetic head slider is to be mounted; and a magnetic head slider mounting apparatus for mounting the magnetic head slider in the predetermined position on the suspension, the magnetic head slider mounting position measuring apparatus including:

an upper camera and a lower camera having opposite photographing optical axes, respectively, which are directed to a flat surface of extension of the suspension;

a front camera having a photographing optical axis which lies on a flat surface parallel to the flat surface of extension of the suspension and which is directed to the suspension;

a side camera having a photographing optical axis which lies on a flat surface parallel to the flat surface of extension of the suspension and which is directed from a direction different from the photographing optical axis of the front camera to the suspension; and control means for obtaining a positional relationship between a top portion of a convex surface formed on a side of the suspension to which the magnetic head slider is to be mounted, and a reference portion formed in the suspension based on images of the suspension captured with the upper camera, the lower camera, the front camera, and the side camera.

Note that the above-mentioned first X-Y coordinates show an X-Y coordinate system which is used when a position of the top portion of the convex surface or the deepest portion of a recess surface in the dimple is obtained with the side camera, the front camera and the lower camera. Also, the above-mentioned second X-Y coordinates show a coordinate system which is used when the magnetic head slider is mounted to the suspension using parameters such as a position of a center line of the suspension extending in a direction of extension of the suspension. The individual cameras are preferably disposed on orthogonal coordinate axes, respectively. However, the positions of disposition of the individual cameras are not intended to be limited to the positions on the axes of the orthogonal coordinate system as long as first and second X-Y coordinates of the objective point can be finally obtained. In addition, a view hole and a touring hole as first and second reference holes will be described as the reference positions in the embodiments or the like. However, the reference portions are not intended to be limited to those holes as long as the reference portions become indexes with which a center line of the suspension, a position or the like of a certain portion can be specified.

According to the present invention, it becomes possible to grasp the precisely positional relationship between the view hole and the touring hole which are used as the reference portions until now, and the dimple. Thus, it becomes possible that the mounting position of the magnetic head slider mounted to the suspension is evaluated to be determined with the central position of the dimple for supporting the magnetic head slider as the reference. As a result, such effects can be produced that the precision of mounting of the magnetic head slider in the miniaturized magnetic head is enhanced, and the stability of posture of the magnetic head core in the actual recording/reproducing operation is also enhanced.

Normally, the dimple is obtained by subjecting a metallic thin plate of which the load beam is to be formed to the press working. Normally, the press working is carried out by sandwiching a metallic thin plate between a drag having a recess surface-like portion and a cope having a convex surface-like portion to deform the metallic thin plate. It is also possible that the position shift may occur between a top portion (the most depressed portion) of the recess surface of the drag and a top portion of the convex surface of the cope. According to the present invention, attention is paid to the position shift as well between those top portions, making it possible to recognize the shift. Consequently, even when such position shift occurs, the magnetic head slider can be precisely mounted to the top portion of the dimple.

DESCRIPTION OF THE PREFERRED EMBODIMENTS

Figure 1A:
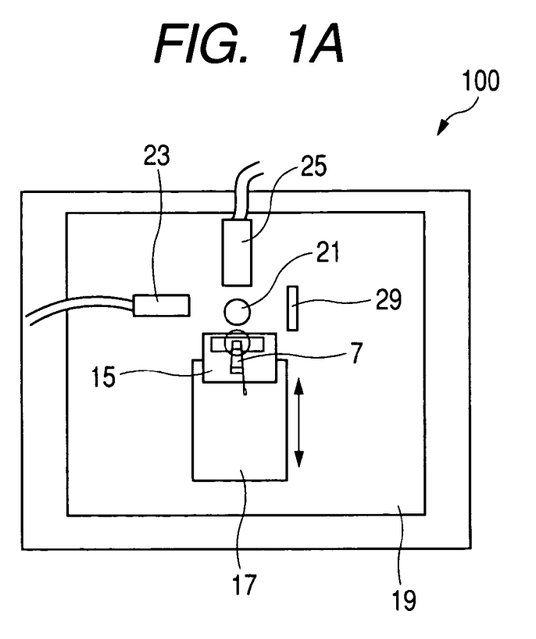
FIG. 1A is a plan view showing a schematic construction of a main portion of a measurement apparatus according to an embodiment mode of the present invention.
Figure 1B:
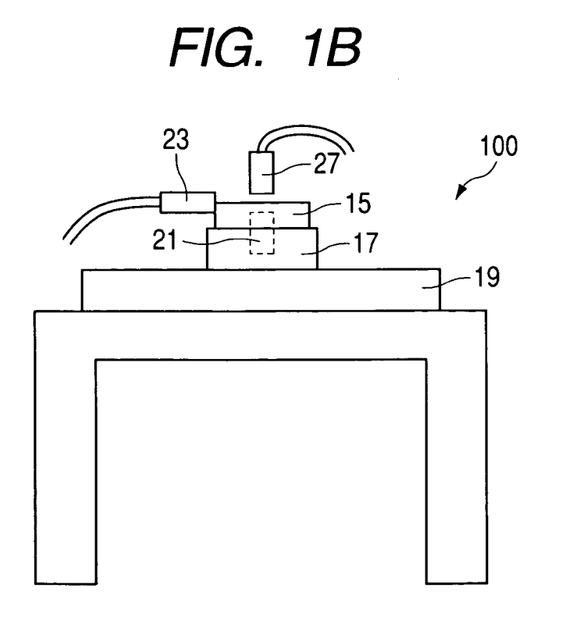
FIG. 1B is a side elevational view showing the schematic construction of the main portion of the measurement apparatus according to the embodiment mode of the present invention.

A schematic construction of a main portion of a measurement apparatus according to an embodiment mode of the present invention will hereinafter be described with reference to the accompanying drawings. FIG. 1A is a schematic plan view of a measurement apparatus according to the present invention, and FIG. 1B is a schematic side elevational view of the measurement apparatus according to the present invention. The measurement apparatus 100 according to the present invention includes an X stage 15 on which a suspension 7 is to be placed, a Y stage 17 for supporting the X stage 15, a stand 19 for supporting the Y stage 17, a lower camera 21, a side camera 23, a front camera 25, and an upper camera 27. The X stage 15 is supported so as to be drivable in a direction indicated by an arrow in the figure (in an X direction) by the Y stage 17. In addition, the Y stage 17 is supported so as to be drivable in a direction perpendicular to the X direction on the drawing by the stand 19.

The front camera 25 has a photographing optical axis which is contained in an extension plane of the suspension 7 or is parallel to the plane of extension of the suspension 7 and which is directed toward the suspension 7. In addition, the side camera 23 has a photographing optical axis which is contained in the extension plane of the suspension 7 or is parallel to the plane of extension of the suspension 7 and which is directed toward the suspension 7 so as to be perpendicular to the photographing optical axis of the front camera 25. The lower camera 21 is disposed nearly right under the center of the dimple 11 and has a photographing optical axis perpendicular to the flat surface of extension of the load beam 3. Note that the front camera 25 and the side camera 23 may also be disposed so as to have different photographing optical axes which exist within the respective flat surfaces parallel to the above-mentioned flat surface of extension of the suspension 7.

The X stage 15 supports thereon the head portion of the suspension 7 so as for the head portion thereof to project in the X direction. In this state, the X stage 15 is driven in the X direction, thereby setting a view hole, a touring hole, and a dimple in the suspension 7 as portions to be measured to come in a field of view of each of the upper camera 27, the lower camera 21, the side camera 23, and the front camera 25. Note that a transmitted illumination may be disposed in the position across the suspension 7 from the camera as in a transmitted illumination 29 for the side camera 23, for example, shown in FIG. 1A to enhance the contrast of a suspension image captured with that camera.

Next, a description will hereinafter be given with respect to a method including actually photographing the dimple to obtain a position of a top portion of a convex portion of the dimple using the measurement apparatus having the construction shown in FIGS. 1A and 1B. The dimple 11 is obtained by forming an upwardly projecting portion in the vicinity of an end portion of the load beam 3 made of a metallic thin plate through the press working. In the present invention, the recess surface of the dimple 11 is photographed with the lower camera 21, thereby obtaining a position of a center of the recess surface of the dimple 11. More specifically, a ring-like light source or a coaxial light source (not shown) is disposed in the periphery of the lower camera 21, and a back face side of the dimple 11 is illuminated by such a light source, thereby obtaining an image shown in FIG. 2. The light applied to the dimple 11 is reflected by the deepest portion or its vicinity of the recess surface of the dimple 11 to form an image 12 within the inner surface of the dimple 11.

Figure 2:
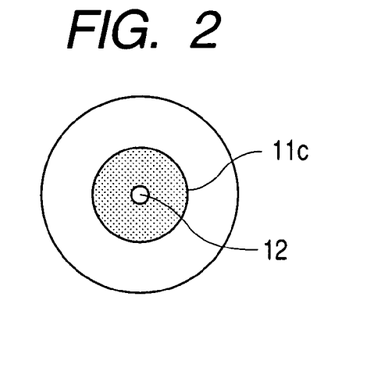
FIG. 2 is a schematic view explaining a method including obtaining a position of the deepest portion of a recess surface of a dimple.

In the captured image, an outer periphery 11c of the recess surface is shown as an outer periphery of a ring-like dark portion, and the deepest portion 11a which is nearly perpendicular to an optical axis of the illumination light is shown as a bright point (the image 12) at the center of the dark portion. The ring-like light source (not shown) is suitably disposed, whereby the center of the image 12 agrees with the center of the dimple 11. Since the recess surface of the dimple 11 is made of the same material as that of the back face of the load beam 3 in the periphery of the dimple 11, the boundary or the like between the dimple 11 and the load beam 3 is essentially difficult to be identified as an image. However, using the image 12 makes it possible to readily obtain X-Y coordinates of the central portion of the dimple 11. Note that, it is supposed that the flat surface regulating the X-Y coordinates is a flat surface which is nearly parallel to a flat surface of extension of the suspension 7.

With the above-mentioned construction, it becomes possible to readily recognize the X-Y coordinates of the central portion of the dimple 11. Using a correlation between the X-Y coordinates of the central portion of the view hole 7a and the touring hole 7b which are obtained with the conventional construction, and the X-Y coordinates of the central portion of the dimple 11 makes it possible to make the center of the magnetic head slider 1 to agree with the center of the dimple 11. In addition, it becomes possible to readily make a direction of mounting of the magnetic head slider 1 to agree with a desired direction. Accordingly, it becomes possible to provide the magnetic head in which even when a more miniature magnetic head slider 1 is used, an amount of floatation of the magnetic head slider 1 in the recording/reproducing operation is reduced, and the posture of the magnetic head slider 1 is stabilized during that operation.

Here, as described above, the dimple 11 may have the position shift between the top portion of the front face side (convex surface) and the most depressed portion of the back face side (recess surface) in the formation surface of the dimple 11. In the magnetic head slider 1, the top portion of the convex surface of the dimple 11 and the center of the dimple 11 need to agree with each other. However, there is a possibility that the position of the top portion of the dimple 11 may not be precisely recognized due to an influence of the position shift. This tendency is judged to be unable to be ignored as the magnetic head slider is further miniaturized.

Figure 3:
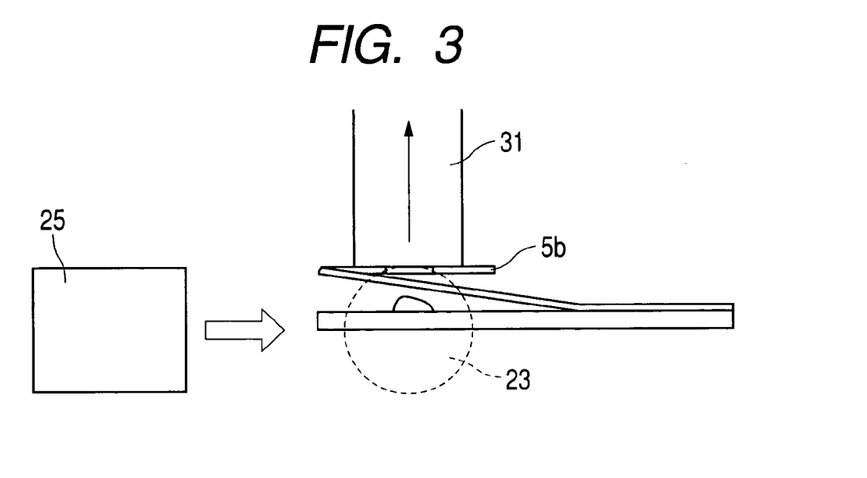
FIG. 3 is a schematic view explaining a method including obtaining a position of a top portion of a convex surface of the dimple.

Then, in the present invention, the position of the top portion of the convex surface of the dimple 11 is actually obtained. A positional relationship between the side camera 23 and the front camera 25, and the suspension 7 in the actual measurement is schematically shown in FIG. 3. For recognition of the top portion of the dimple 11, the dimple 11 is photographed with the front camera 25, and the side camera 23 which lies on nearly the same flat surface as that of the front camera 25 and which is adapted to photograph the dimple 11 from a direction perpendicular to the direction of photographing by the front camera 25. The X-Y coordinates of the top portion of the dimple 11 on the flat surface of extension of the suspension 7 can be obtained based on the position of the top portion of the dimple 11 which is recognized within photographing areas of the individual cameras 23 and 25.

Normally, the dimple 11 tightly contacts the tongue 5b formed in the flexure 5 to push up the tongue 5b from a flexure main body portion 5a. Thus, the top portion of the dimple 11 is inserted into the hole for formation of the tongue 5b which is bored through the flexure main body 5a. Hence, in the case where the dimple 11 takes up the normal posture, it is difficult to photograph the dimple 11 with the side camera 23 or the front camera 25. For this reason, in this embodiment mode, there is disposed a tongue holding nozzle 31 adapted to suck and hold the tongue 5b. The tongue 5b is sucked by the tongue holding nozzle 31, and in this state, the tongue holding nozzle 31 is moved upwardly, thereby estranging the tongue 5b from the top portion of the dimple 11, which results in that the top portion of the dimple 11 can be photographed with the side camera 23 and the front camera 25.

Note that when an amount of movement of the tongue holding nozzle 31 is excessively large, or when a holding time in the movement state is excessively long, the flexure 5 may be deformed. Accordingly, an amount of estrangement of the tongue 5b from the top position of the dimple 11 by the tongue holding nozzle 31, and a time period required for the estrangement thereof are preferably reduced as much as possible. In addition, the process for recognizing the top portion of the dimple 11 using the tongue holding nozzle 31 may be carried out separately from the process for actually mounting the magnetic head slider 1 on the tongue 5b in some cases.

Figure 4:
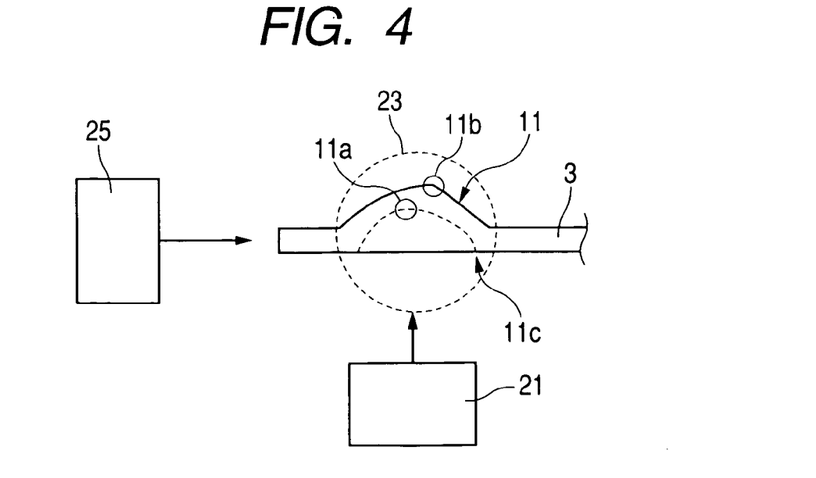
FIG. 4 is a schematic view explaining a method including obtaining an amount of position shift between the deepest portion of the recess surface and the top portion of the convex portion on an X-Y coordinate system in the dimple.

Next, a description will hereinafter be given with respect to a method including obtaining the position shift between the top portion of the front face side (convex surface) and the most depressed portion (the deepest portion) of the back face (recess surface) in the formation surface of the dimple 11. FIG. 4 shows the disposition of the lower camera 21, the side camera 23, and the front camera 25 when the position shift is obtained. The recess surface of the dimple 11 is photographed with the lower camera 21 to obtain X-Y coordinates of the most depressed portion 11a of the recess surface in the X-Y plane (the extension surface of the suspension 7). At the same time, the convex surface of the dimple 11 is photographed with the front camera 25 and the side camera 23 to obtain X-Y coordinates of the top portion 11b of the convex surface in an X-Y plane. While those X-Y planes are actually planes which are parallel to the direction of extension of the suspension 7, an amount of resultant position shift between the deepest portion 11a of the recess surface of the dimple 11 and the top portion 11b of the convex surface of the dimple 11 on the X-Y coordinate system is calculated irrespective of a distance between those X-Y planes.

The amount of resultant position shift between the deepest portion 11a of the recess surface of the dimple 11 and the top portion 11b of the convex surface of the dimple 11 on the X-Y coordinate system, and a direction of the position shift between the deepest portion 11a of the recess surface and the top portion 11b of the convex surface of the dimple 11 on the X-Y coordinate system are obtained in advance through the above-mentioned operation. In the process for actually mounting the magnetic head slider 1, the position of the dimple 11 is only verified with the lower camera 21 to determine the position of the mounting of the magnetic head slider 1. In this case, there is carried out only the verification with the lower camera 21 which is tinged with an amount of position shift, and the like. The position of the mounting of the magnetic head slider 1 to the suspension 7 is determined in such a manner, whereby even when the magnetic head slider 1 is further miniaturized and lightened, and hence an amount of floatation of the magnetic head slider 1 becomes narrow, it becomes possible to manufacture the magnetic head with which the excellent recording/reproducing operation can be carried out.

Note that, the present invention aims at making the X-Y coordinates of the top portion 11b of the convex surface of the dimple 11 to agree with the X-Y coordinates of the central position in the magnetic head slider 1, and at making a direction of a line connecting the top portion 11b and the view hole 7a agree with a predetermined direction along which the magnetic head slider 1 is to be disposed. Thus, if the X-Y coordinates of the deepest portion of the recess surface of the dimple 11 agree with the X-Y coordinates of the top portion of the convex surface of the dimple 11, the process for obtaining the X-Y coordinates of the top portion of the convex surface becomes unnecessary. In addition, if a target with which the X-Y coordinates of the top portion of the convex surface of the dimple 11 can be analogized can be set in a portion different from the deepest portion 11a of the recess surface of the dimple 11, the process for obtaining a position of the deepest portion 11a of the recess surface of the dimple 11 may be replaced with the process for obtaining the coordinates of the target. In addition, in this embodiment mode, the view hole and the touring hole which are bored through the suspension are used as the reference portions. However, the constructions of the reference portions are not intended to be limited to the forms of those reference holes. Thus, constructions including various forms such as a mark and an external form of a suspension may be used as the reference portions.

First Embodiment

Figure 5:
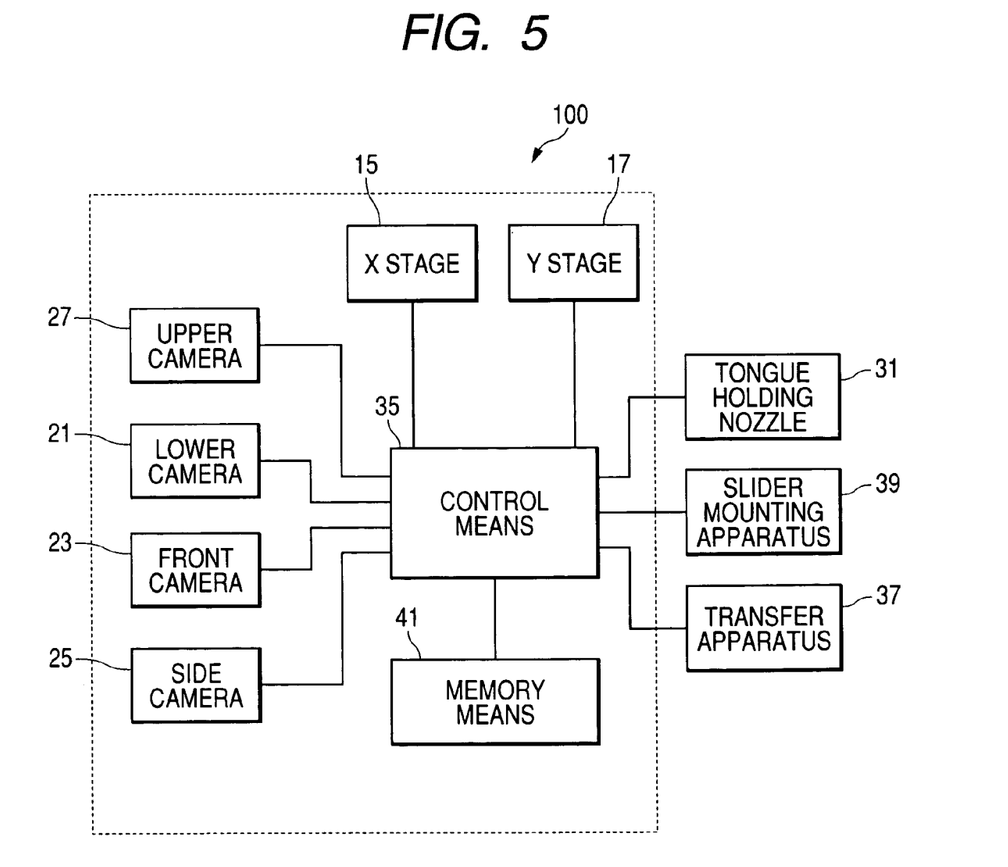
FIG. 5 is a block diagram showing a configuration of a measurement apparatus according to a first embodiment of the present invention.

An apparatus for measuring a position of a dimple according to a first embodiment of the present invention, and a magnetic head manufacturing system for mounting a magnetic head slider to a suspension using the measurement apparatus will hereinafter be described with reference to a block diagram of FIG. 5. Note that since the details of the main portion in this configuration have been described above with reference to FIGS. 1A and 1B, its description is omitted here for the sake of simplicity. The measurement apparatus 100 includes the upper camera 27, the lower camera 21, the front camera 23, and the side camera 25 which are connected to control means 35. The control means 35 carries out the image analysis for the images captured with the upper camera 27, the lower camera 21, the front camera 23, and the side camera 25 to obtain the X-Y coordinates, the disposition and the like of the view hole, the center of the dimple 11 and the like, for example.

In addition, the control means 35 carries out: the operation for driving the X stage 15 and the Y stage 17 for fixedly holding the suspension 7 to position the suspension 7 at the central portion of a field of view of each of the upper camera 27, the lower camera 21, the front camera 23, and the side camera 25; the operation for conveying the suspension 7 to a transfer apparatus 37 or a slider mounting apparatus 39; or the like. Also, the control means 35 obtains the position of mounting or the like of the magnetic head slider 1 to the suspension 7 based on the resultant X-Y coordinates or the like of the center of the dimple 11 to carry out the position control in the slider mounting apparatus 39. Note that all data related to the resultant X-Y coordinates or the like of the center of the dimple 11 is stored in memory means 41, and when the magnetic head slider 1 is intended to be mounted to the suspension 7, the data is read out from the memory means 41 to be used for the position control.

The measurement apparatus 100 is configured in the form of a unit, and is suitably connected to the magnetic head slider mounting apparatus 39 or the like following the measurement apparatus 100 so that the suitable mounting process can be carried out. In this case, for example, the suspension 7 may not be directly transferred to the mounting apparatus 39, but may be conveyed to the slider mounting apparatus 39 through the independent transfer apparatus 37. The measurement apparatus 100 is connected to the transfer apparatus 37 and the slider mounting apparatus 39, thereby configuring the magnetic head manufacturing system.

Figure 6:
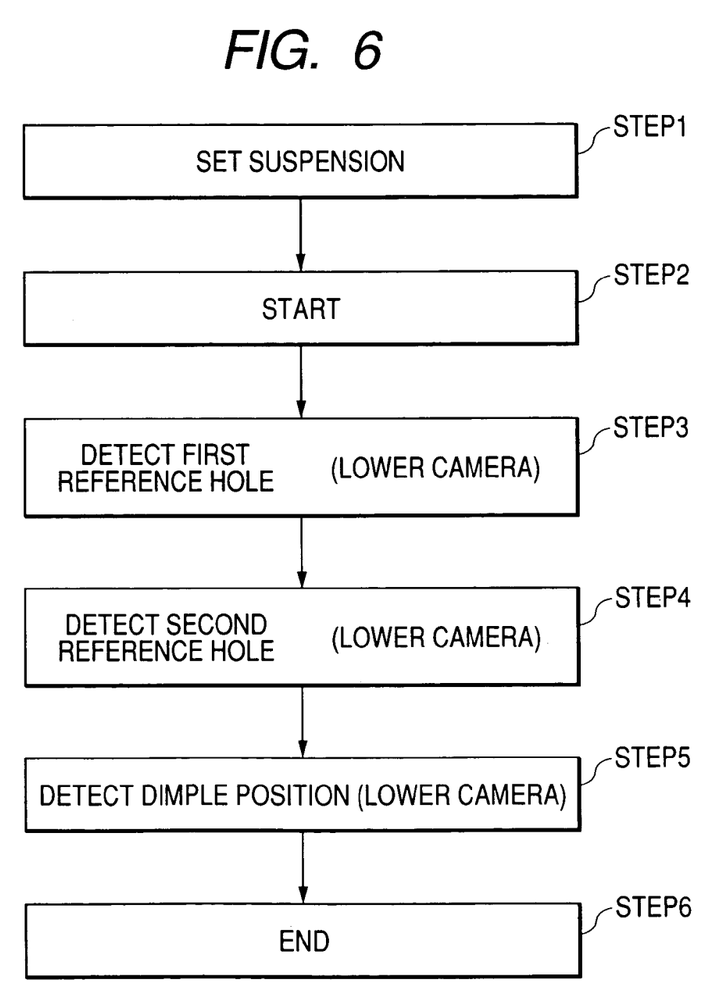
FIG. 6 is a flow chart showing a procedure for obtaining the deepest portion of the recess surface of the dimple.

FIG. 6 is a flow chart showing a process for obtaining actually the position of the center of the dimple 11 with the measurement apparatus 100. In measuring the formation position of the dimple 11 on the suspension 7, the suspension 7 is set on the X stage 15 to start the actual measurement process. In the measurement process, first of all, in Step 3, a reference hole 1, e.g., the view hole 7a is photographed with the lower camera 21 to obtain first X-Y coordinates of a center of the reference hole 1. In subsequent Step 4, a reference hole 2, e.g., the touring hole 7b is photographed with the lower camera 21 to obtain first X-Y coordinates of a center of the reference hole 2. The placing state of the suspension 7 with respect to the X stage 15 is verified through those operations. All data related to the X-Y coordinates or the like of the centers of those reference holes 1 and 2 is stored in the memory means 41.

After completion of the above-mentioned processes, in Step 5, the recess surface portion of the dimple 11 is photographed with the lower camera 21. The control means 35 obtains first X-Y coordinates of the deepest portion 11a of the recess surface of the dimple 11 based on the image 12 of the deepest portion 11a of the recess surface of the dimple 11 which is obtained in the form as shown in FIG. 2. The actual disposition of the center of the dimple 11 (the deepest portion 11a of the recess surface portion in this case) on the suspension 7 (the load beam 3) is obtained based on the first X-Y coordinates of the centers of the reference holes 1 and 2 which have already been obtained. When the position shift which will be described later does not occur between the top portion 11b of the convex surface of the dimple 11 and the deepest portion 11a of the recess surface of the dimple 11 on the X-Y coordinate system, the process for mounting the magnetic head slider 1 to the suspension 7 may be carried out based on the data which has been obtained through the operations until now.

Figure 7:
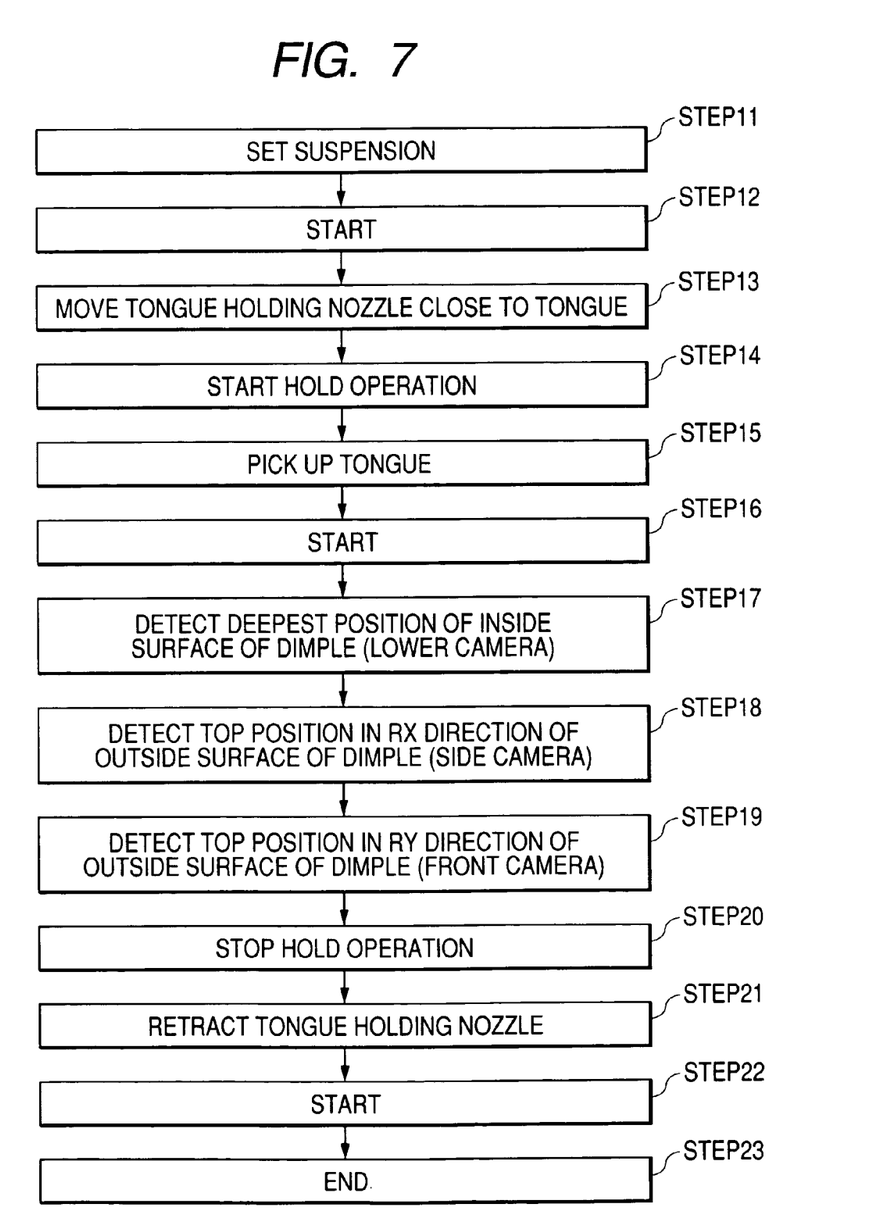
FIG. 7 is a flow chart showing a procedure for obtaining an amount of position shift between the deepest portion of the recess surface and the top portion of the convex surface on X-Y coordinate system in the dimple.

Next, a description will hereinafter be given with respect to a process for obtaining an amount of position shift between the top portion 11b of the convex surface of the dimple 11 and the deepest portion 11a of the recess surface of the dimple 11 with reference to a flow chart of FIG. 7. In this process, the tongue holding nozzle 31 is moved close to the tongue 5b in the suspension 7 placed on the X-stage 15 (Step 13). The tongue 5b is sucked and is further held up by a predetermined amount, thereby obtaining a state in which the convex surface of the dimple 11 can be photographed (Steps 14 and 15).

In this state, an operation for obtaining an amount of position shift of the actual center of the dimple 11 is started (Step 16). In this operation, first of all, in Step 17, the recess surface of the dimple 11 is photographed with the lower camera 21 to obtain first X-Y coordinates of the deepest portion 11a of the recess surface of the dimple 11 based on the photographing results in the control means 35. Subsequently, the convex surface of the dimple 11 is photographed with the side camera 23 to obtain first X-Y coordinates of the top portion 11b of the convex surface in the X direction by the control means 35. In addition, in Step 19, the convex surface of the dimple 11 is photographed with the front camera 21 to obtain first X-Y coordinates of the top portion 11b of the convex surface in the Y direction by the control means 35.

An amount of position shift and a direction of the position shift are obtained from the resultant first X-Y coordinates of the deepest portion 11a of the recess surface of the dimple 11, and the resultant first X-Y coordinates of the top portion 11b of the convex surface of the dimple 11. All data related to the first X-Y coordinates of the deepest portion 11a of the recess surface and the first X-Y coordinates of the top portion 11b of the convex surface, the amount of position shift between the top portion 11b of the convex surface and the deepest portion 11a of the recess surface, and the like is stored in the memory means 41. Thereafter, the holding operation by the tongue holding nozzle 31 is stopped to retract the tongue holding nozzle 31 (Steps 20 to 22). The amount of position shift between the top portion 11b of the convex surface of the dimple 11 and the deepest portion 11a of the recess surface of the dimple 11 is obtained through the above-mentioned operations.

Figure 8:
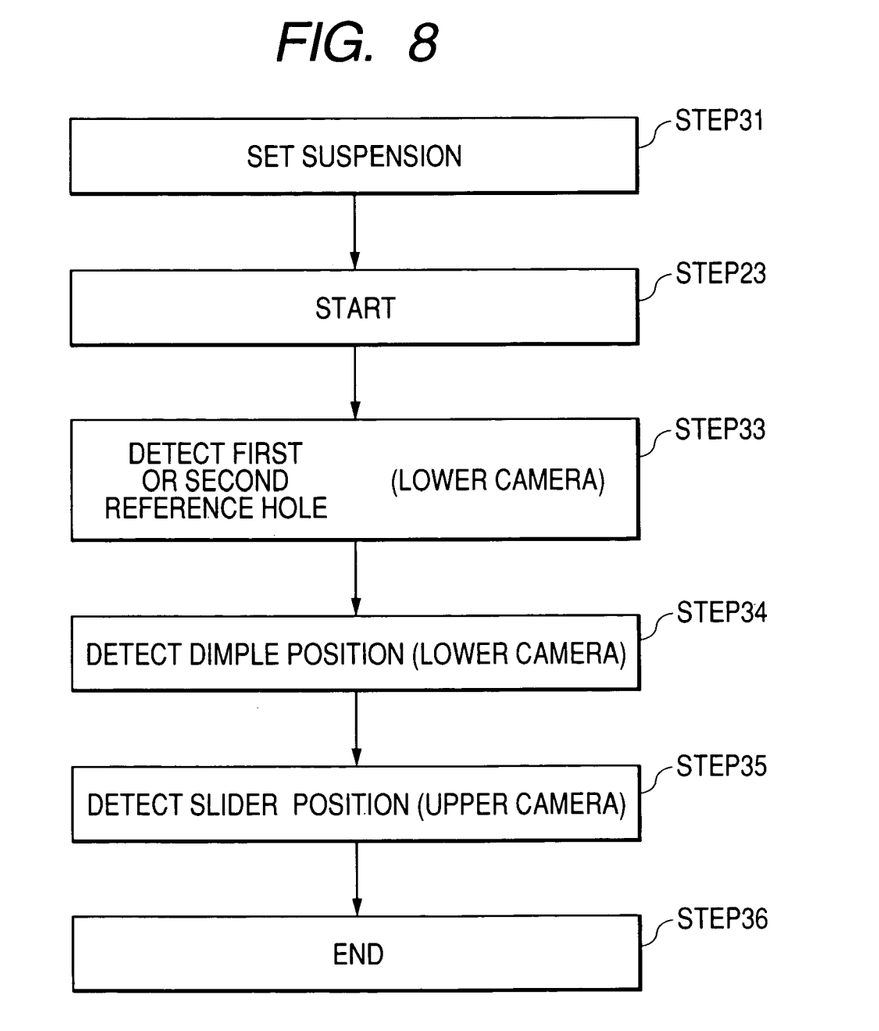
FIG. 8 is a flow chart showing a procedure for making the top portion of the convex surface of the dimple and the center of a magnetic head slider to agree with each other on an X-Y coordinate system.

Next, a description will hereinafter be given with respect to a process for mounting the magnetic head slider 1 to the suspension 7 based on the measured values which are obtained through the above-mentioned operations. FIG. 8 is a flow chart showing a flow of this process. In this process, the reference hole 1 or 2 bored through the suspension 7 placed on the X stage 15 is photographed with the lower camera 21 to obtain second X-Y coordinates of the center of the reference hole 1 or 2 (Step 33). The resultant second X-Y coordinates of the center of the reference hole 1 or 2 are compared with the first X-Y coordinates of the center of the reference hole 1 or 2 which are previously stored in the memory means 41. In subsequent Step 34, the recess surface of the dimple 11 is photographed with the lower camera 21 to obtain second X-Y coordinates of the deepest portion 11a of the recess surface of the dimple 11. Then, the data related to the first X-Y coordinates of the reference hole 1 or 2 which are previously obtained, and the amount of position shift which is obtained from the first X-Y coordinates of the deepest portion 11a of the recess surface and from the first X-Y coordinates of the top portion 11b of the convex surface is read out from the memory means 41. Then, a second X-Y coordinate system and a reference point which becomes the reference for mounting of the magnetic head slider 1 are obtained based on such data.

Subsequently, the magnetic head slider 1 is photographed with the upper camera 27 (Step 35). The magnetic head slider 1 has nearly a rectangular parallelepiped-like shape. Thus, the magnetic head slider 1 is photographed from the upper side, and a resultant image is image-analyzed, whereby a central portion and a center line in a plane parallel to the flat surface of extension of the suspension 7 are obtained. In the actual, mounting process, the magnetic head slider 1 is mounted to the tongue 5b such that the X-Y coordinates of the central portion of the magnetic head slider 1 agrees with the second X-Y coordinates of the top portion 11b of the recess surface of the dimple 11 on the X-Y plane (the flat surface of extension of the suspension 7). Note that since the apparatus for actually carrying out the mounting process does not include any portions particularly different from those of the apparatus which has been conventionally used, its description is omitted here for the sake of simplicity. In addition, in the mounting process, the center line of the magnetic head slider 1 is simultaneously made to agree with the predetermined direction which is obtained from the dimple 11 and the reference holes 1 and 2 and along which the magnetic head slider 1 is to be disposed.

Second Embodiment

The present invention aims at making the X-Y coordinates of the top portion 11b of the recess surface of the dimple 11 to agree with the central position in the magnetic head slider 1 on the X-Y coordinate system, and also making the line connecting the top portion 11b and the view hole 7a to agree with the predetermined direction along which the magnetic head slider 1 is to be disposed. In the first embodiment, the description has been given with respect to the case where the suspension 7 has the view hole 7a and the touring hole 7b which are the same as those in the related art. However, those holes 7a and 7b can not be photographed from the side face with the side camera 23. Thus, in the first embodiment, the position of the deepest portion 11a of the recess surface of the dimple 11 is obtained, and the positional relationship between the deepest portion 11a of the recess surface of the dimple 11 and the top portion 11b of the convex surface of the dimple 11 is obtained, whereby the X-Y coordinates of the top portion 11b which can not be measured in the actual magnetic head slider mounting process are obtained through the measurement of the recess portion of the dimple 11.

Figure 9A:
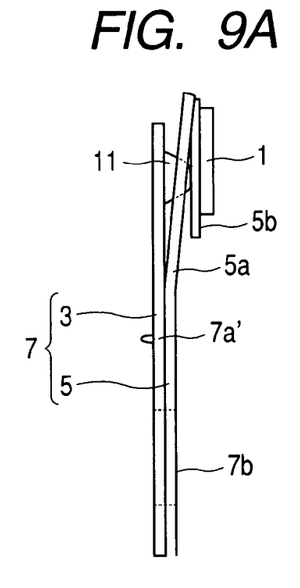
FIG. 9A is a schematic side elevational view of a main portion in a state of mounting of the magnetic head slider to a suspension according to a second embodiment of the present invention.
Figure 9B:
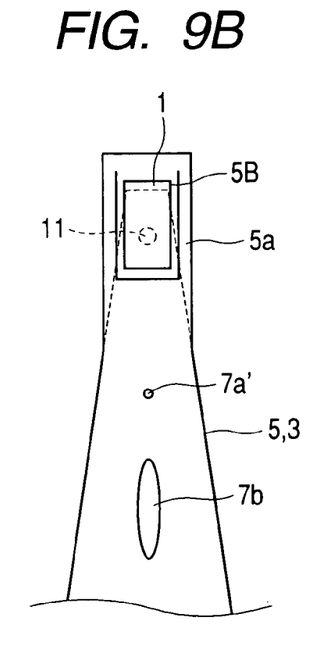
FIG. 9B is a schematic plan view of the main portion in the state of mounting of the magnetic head slider to the suspension according to the second embodiment of the present invention.

In this embodiment, as shown in FIGS. 9A and 9B, a projection 7a' which can be measured in its position on the X-Y coordinate system with the side camera 23, the front camera 25, and the lower camera 21 is formed on the suspension 7 instead of the view hole 7a. That is to say, the projection 7a' is formed so as to project from the surface of the suspension 7 opposite to the mounting surface of the suspension 7 for mounting of the magnetic head slider 1. A positional relationship between the top portion 11b of the convex surface of the dimple 11 and the projection 7a' of the suspension 7 on the X-Y coordinate system which is obtained with the side camera 23 is obtained from an image obtained by photographing the projection 7a' with the side camera 23. In addition, a positional relationship between the top portion 11b of the convex surface of the dimple 11 and the projection 7a' of the suspension 7 on the X-Y coordinate system which is obtained with the front camera 25 is obtained from an image obtained by photographing the projection 7a' with the front camera 25.

Even when the X-Y coordinates of the top portion 11b of the dimple 11 are not directly measured for the individual suspensions in the actual mounting process, the X-Y coordinates of the top portion 11b of the convex surface of the dimple 11 can be obtained based on the X-Y coordinates of the projection 7a' and the reference hole by using the relationship between the X-Y coordinates of the projection 7a' and the X-Y coordinates of the top portion 11b of the convex surface of the dimple 11 which are obtained in a manner as described above. Accordingly, the process for obtaining the position of the projection 7a' is used instead of the process for obtaining the position of the deepest portion 11a of the recess surface of the dimple 11 which is carried out in the first embodiment, whereby the same effects as those of the first embodiment can be obtained. Note that the shape of the projection 7a' is not intended to be limited to the projection-like shape, and hence an arbitrary object may be adopted as long as the object has a shape as an index which can be verified in its existing position with the front camera 25 and the side camera 23. Since other constituent elements are the same as those of the first embodiment, their descriptions are omitted here for the sake of simplicity.

As set forth hereinabove, implementation of the present invention offers the effects that the precision of mounting of the magnetic head slider in the miniaturized magnetic head is enhanced, and the stability of the posture of the magnetic head core in the actual recording/reproducing operation is also enhanced.

This application claims priority from Japanese Patent Application No. 2003-368462 filed Oct. 29, 2003, which is hereby incorporated by reference herein.

What is claimed is:

1. A magnetic head slider mounting position measuring apparatus for measuring a predetermined position on a suspension where a magnetic head slider is to be mounted for use in a magnetic head in which the magnetic head slider is to be mounted in the predetermined position on the suspension having an index and a reference portion so as to be directed in a predetermined direction, the magnetic head slider mounting position measuring apparatus comprising:

an upper camera and a lower camera having opposite photographing optical axes, respectively, which are perpendicular to a flat surface of extension of the suspension;

a front camera having a photographing optical axis which lies on a flat surface parallel to the flat surface of extension of the suspension and which is directed to the suspension;

a side camera having a photographing optical axis which lies on a flat surface parallel to the flat surface of extension of the suspension and which is directed from a direction different from the photographing optical axis of the front camera to the suspension; and control means for obtaining a positional relationship between a top portion of a convex surface formed on a side of the suspension to which the magnetic head slider is to be mounted, and a reference portion formed in the suspension based on images of the suspension captured with the upper camera, the lower camera, the front camera, and the side camera.

2. A magnetic head manufacturing system for mounting a magnetic head slider in a predetermined direction in a predetermined position on a suspension having a convex surface and a reference portion formed on a side to which the magnetic head slider is to be mounted, the magnetic head manufacturing system comprising:

a magnetic head slider mounting position measuring apparatus for measuring the predetermined position on the suspension on which the magnetic head slider is to be mounted; and a magnetic head slider mounting apparatus for mounting the magnetic head slider in the predetermined position on the suspension, the magnetic head slider mounting position measuring apparatus comprising:

an upper camera and a lower camera having opposite photographing optical axes, respectively, which are directed to a flat surface of extension of the suspension;

a front camera having a photographing optical axis which lies on a flat surface parallel to the flat surface of extension of the suspension and which is directed to the suspension;

a side camera having a photographing optical axis which lies on a flat surface parallel to the flat surface of extension of the suspension and which is directed from a direction different from the photographing optical axis of the front camera to the suspension; and control means for obtaining a positional relationship between a top portion of a convex surface formed on a side of the suspension to which the magnetic head slider is to be mounted, and a reference portion formed in the suspension based on images of the suspension captured with the upper camera, the lower camera, the front camera, and the side camera.

* * * * *